US011334236B2

(12) United States Patent
Fujisaki et al.

(10) Patent No.: US 11,334,236 B2
(45) Date of Patent: May 17, 2022

(54) DEVICE MAINTENANCE APPARATUS, DEVICE MAINTENANCE METHOD, AND DEVICE MAINTENANCE PROGRAM

(71) Applicant: Yokogawa Electric Corporation, Tokyo (JP)

(72) Inventors: Morihiro Fujisaki, Musashino (JP); Ryuta Motooka, Musashino (JP); Yoshio Uomori, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/478,366

(22) Filed: Sep. 17, 2021

(65) Prior Publication Data

US 2022/0100363 A1    Mar. 31, 2022

(30) Foreign Application Priority Data

Sep. 29, 2020 (JP) .............................. JP2020-163211

(51) Int. Cl.
*G06F 3/048* (2013.01)
*G06F 3/04847* (2022.01)
*G06F 16/248* (2019.01)
*G06F 16/245* (2019.01)
*G06F 3/0482* (2013.01)

(52) U.S. Cl.
CPC ........ *G06F 3/04847* (2013.01); *G06F 3/0482* (2013.01); *G06F 16/245* (2019.01); *G06F 16/248* (2019.01)

(58) Field of Classification Search
None
See application file for complete search history.

(56) References Cited

U.S. PATENT DOCUMENTS

| 2015/0105878 | A1* | 4/2015 | Jones ................. G06F 9/44505 700/83 |
| 2015/0160816 | A1 | 6/2015 | Furihata |
| 2017/0344196 | A1* | 11/2017 | Chakravarty ......... G06F 3/0482 |
| 2017/0344201 | A1* | 11/2017 | Furihata .............. G06F 3/04847 |
| 2019/0104020 | A1* | 4/2019 | Tero .................... H04L 41/5006 |

FOREIGN PATENT DOCUMENTS

| EP | 2618109 A1 | 7/2013 |
| EP | 3232380 A1 | 10/2017 |
| EP | 3239797 A1 | 11/2017 |
| EP | 3352033 A1 | 7/2018 |
| JP | 2008-3649 A | 1/2008 |
| JP | 2015-109011 A | 6/2015 |

\* cited by examiner

*Primary Examiner* — Thanh T Vu
(74) *Attorney, Agent, or Firm* — Rankin, Hill & Clark LLP

(57) ABSTRACT

A device maintenance apparatus which performs a maintenance of a device, includes: a storage configured to store device definition information in which a parameter of the device is defined; an acquirer configured to acquire device information from a maintenance target device which is a device of maintenance target; and a display processor configured to display, on a display, a first button using the device definition information stored in the storage and the device information acquired by the acquirer, the first button being a button for transitioning to a screen on which details of the parameter is displayed for each parameter of the maintenance target device, at least a name of the parameter and a value of the parameter being attached to the first button.

20 Claims, 11 Drawing Sheets

DEVICE MAINTENANCE APPARATUS, DEVICE MAINTENANCE METHOD, AND DEVICE MAINTENANCE PROGRAM

BACKGROUND

Field of the Invention

The present invention relates to a device maintenance apparatus, a device maintenance method, and a device maintenance program.

Priority is claimed on Japanese Patent Application No. 2020-163211, filed on Sep. 29, 2020, the contents of which are incorporated herein by reference.

Description of Related Art

Generally, in plants, factories, and the like (hereinafter simply referred to as a "plant" at the time of collectively referring to these), maintenance is performed regularly or irregularly from the viewpoint of preventing an abnormal operation and maintaining performance. For example, in a plant in which a distribution control system (DCS) is constructed, maintenance by a worker with a field device (hereinafter may be abbreviated as a "device" in some cases) is performed on a regular or irregular basis.

Maintenance of a field device is performed using a device maintenance apparatus in which wired communication or wireless communication is possible between the device maintenance apparatus and the field device. This device maintenance apparatus is, for example, a laptop type or tablet type computer, a personal digital assistant (PDA), a smartphone, or the like in which a dedicated program for maintaining a field device is installed. Maintenance items for a field device include, for example, various maintenance work items according to a field device which is a maintenance target such as confirmation work for reading and confirming device information set in a field device which is a maintenance target and setting work for setting new device information to a field device which is a maintenance target.

Japanese Unexamined Patent Application Publication No. 2015-109011 which will be described later discloses an example of a device maintenance apparatus in the related art. In this device maintenance apparatus, a display item selection menu and a device information display field are provided on a display screen and it is possible to change the information to be displayed in the device information display field in accordance with an operation on the display item selection menu. For example, it is possible to display the device information read from a field device or display the attached information such as a command recorded by a user in accordance with an operation on the display item selection menu.

Incidentally, a device maintenance apparatus displays device information using device definition information (for example, information stored in a device description (DD) file) prepared by a vendor of a field device. In this device definition information, menus associated with maintenance are also defined, in addition to all characteristics and attributes (parameters) of the field device provided by the vendor. Since the device definition information is defined hierarchically, a user of the device maintenance apparatus needs to follow a tree-shaped menu (a menu tree) according to a layer and display desired parameters. For example, the parameters include information representing the characteristics and the attributes of the field device, information used for the characteristics and the attributes, and the like.

Many of the display screens of the device maintenance apparatuses in the related art include a menu display field in which the above-described menu tree is displayed and a parameter display field in which various parameters of the field device are displayed. Here, most of the device maintenance apparatuses have a small size because the device maintenance apparatuses are carried and used by users. For this reason, in a state in which the menu display field and the parameter display field described above are displayed on a small display screen of the device maintenance apparatus, there is a problem that confirming and setting the parameters may be difficult and work efficiency may be low.

SUMMARY

A device maintenance apparatus which performs a maintenance of a device, may include: a storage configured to store device definition information in which a parameter of the device is defined; an acquirer configured to acquire device information from a maintenance target device which is a device of maintenance target; and a display processor configured to display, on a display, a first button using the device definition information stored in the storage and the device information acquired by the acquirer, the first button being a button for transitioning to a screen on which details of the parameter is displayed for each parameter of the maintenance target device, at least a name of the parameter and a value of the parameter being attached to the first button.

Further features and aspects of the present disclosure will become apparent from the following detailed description of exemplary embodiments with reference to the attached drawings.

DETAILED DESCRIPTION OF THE INVENTION

Figure 1:
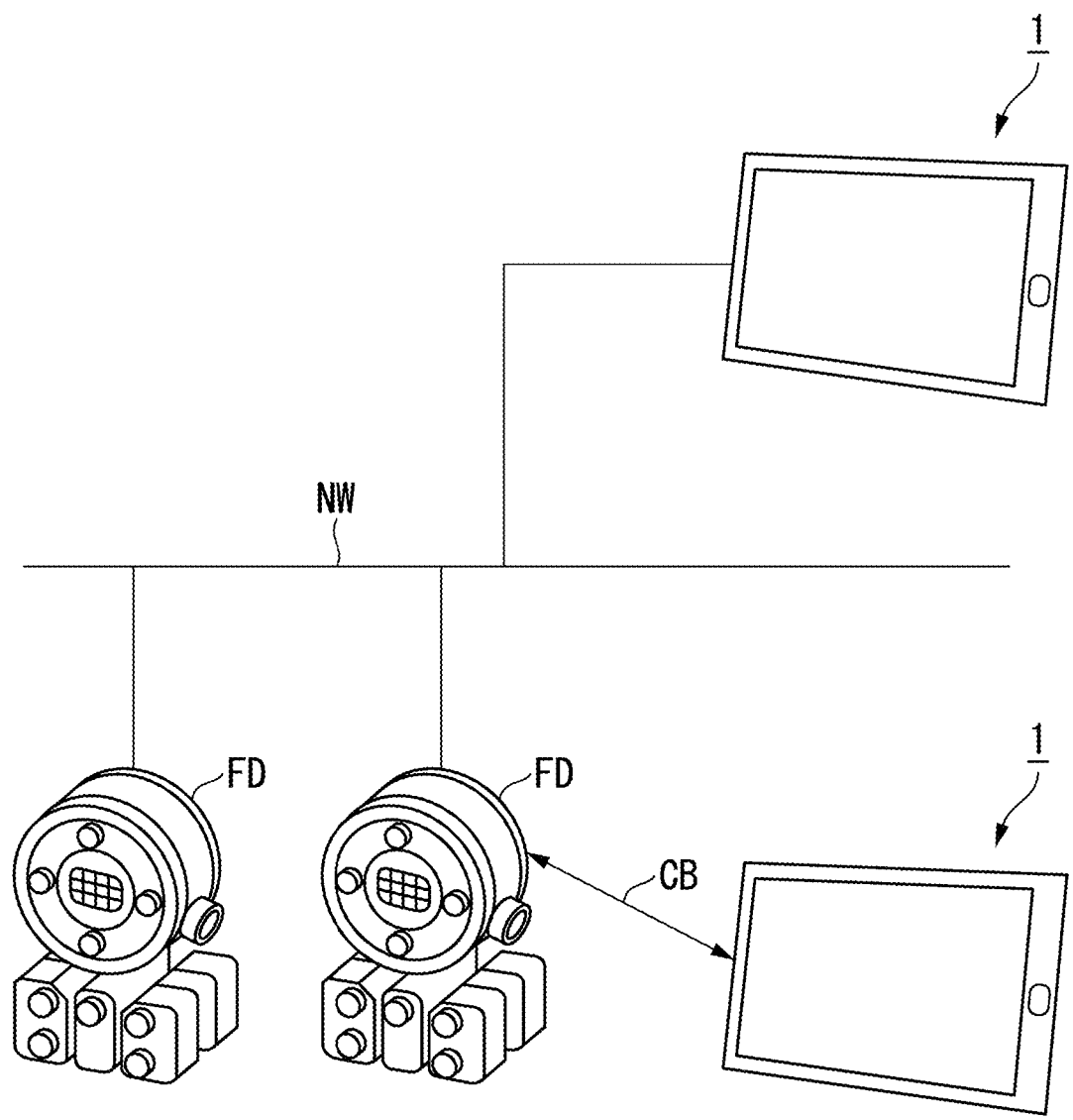
FIG. 1 is a diagram showing an exterior form of a device maintenance apparatus according to an embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a device maintenance apparatus, a device maintenance method, and a device maintenance program allowing parameters of a device to be confirmed easily and improving work efficiency of maintenance work.

A device maintenance apparatus, a device maintenance method, and a device maintenance program according to an embodiment of the present invention will be described in detail below with reference to the drawings. In the following description, an outline of the embodiment of the present invention will be first described and then details of each embodiment of the present invention will be described.

[Outline]

The embodiment of the present invention is an embodiment in which it is possible to easily confirm parameters of a device and improve work efficiency of maintenance work. To be specific, confirming and setting the parameters and improving work efficiency is easy even when a display screen of a device maintenance apparatus used by a user has a small size.

Since the device definition information used in the device maintenance apparatus is defined hierarchically, the user of the device maintenance apparatus needs to follow a menu tree which is a tree-shaped menu according to the layer and display desired parameters. For this reason, many of the device maintenance apparatuses in the related art include a menu display field in which a menu tree is displayed and a parameter display field in which various parameters for a field device are displayed. In a state in which such a menu display field and a parameter display field are displayed on a small display screen of the device maintenance apparatus, it is difficult for the user to confirm and set the parameters, which reduces work efficiency.

Also, since the device maintenance apparatus in the related art needs to follow a menu tree and display desired parameters, if a structure of the menu tree is not understood to some extent, it takes a long time to find the desired parameters and the work efficiency is lowered. In addition, although the detailed information of various parameters is defined in the device definition information in the device maintenance apparatus in the related art, detailed information is not displayed. For this reason, the user of the device maintenance apparatus needs to understand the meaning of each of the parameters from a name of the parameter displayed on a display screen. However, when the user of the device maintenance apparatus is a user who is not familiar with the maintenance work, understanding the meaning of a parameter from the name of the parameter displayed on the display screen is difficult.

In the embodiment of the present invention, a first button which is a button which acquires device information from a maintenance target device which is a device to be maintained and which causes transition to a screen for displaying details of parameters for each parameter of the maintenance target device using device definition information in which parameters of the device are defined and the acquired device information and having at least the name of a parameter and a value of a parameter attached thereto are provided is displayed on a display. In this way, since a plurality of pieces of information (the name of the parameter, the value of the parameter, and a screen transition destination in which details of the parameter are displayed) are aggregated in one button in the embodiment, it is possible to easily confirm the parameters of the device and improve the work efficiency of the maintenance work.

[Details]

<Device Maintenance Apparatus>

FIG. 1 is a diagram showing an exterior form of the device maintenance apparatus according to the embodiment of the present invention. As shown in FIG. 1, a device maintenance apparatus 1 in the embodiment is connected to field devices FD (devices or maintenance target devices) installed in a plant via a communication cable CB or over a network NW. The network NW is a network laid in a plant which connects each of the field devices FD and a controller (not shown) which controls the field devices FD. For example, the device maintenance apparatus 1 is connected to a terminal block (not shown) constituting the network NW and is connected from the terminal block to the field devices FD. The device maintenance apparatus 1 acquires and displays device information (parameters) of the field device FD by communicating between the device maintenance apparatus 1 and the field devices FD or sets new parameters in the field devices FD in response to a user's instruction.

The field device FD is, for example, a sensor device such as a flow meter and a temperature sensor, a valve device such as a flow control valve and an on-off valve, an actuator device such as a fan and a motor, or devices installed at other sites in a plant. A plurality of field devices FD are installed in the plant and each of these is connected to the network NW laid in the plant and controlled by the above-described controller.

Examples of the plant in which the field device FD is installed include a chemical plant such as a petroleum refining plant and a water treatment plant. Furthermore, in addition to these, the plant may include industrial plants, plants in which well sources such as gas fields and oil fields and the surroundings thereof are managed and controlled, plants in which power generation using hydropower, thermal power, nuclear power, or the like is managed and controlled, plants in which harvesting of energy using solar power, wind power, or the like is managed and controlled, plants in which water and sewage, dams, and the like are managed and controlled, and the like.

Figure 2:
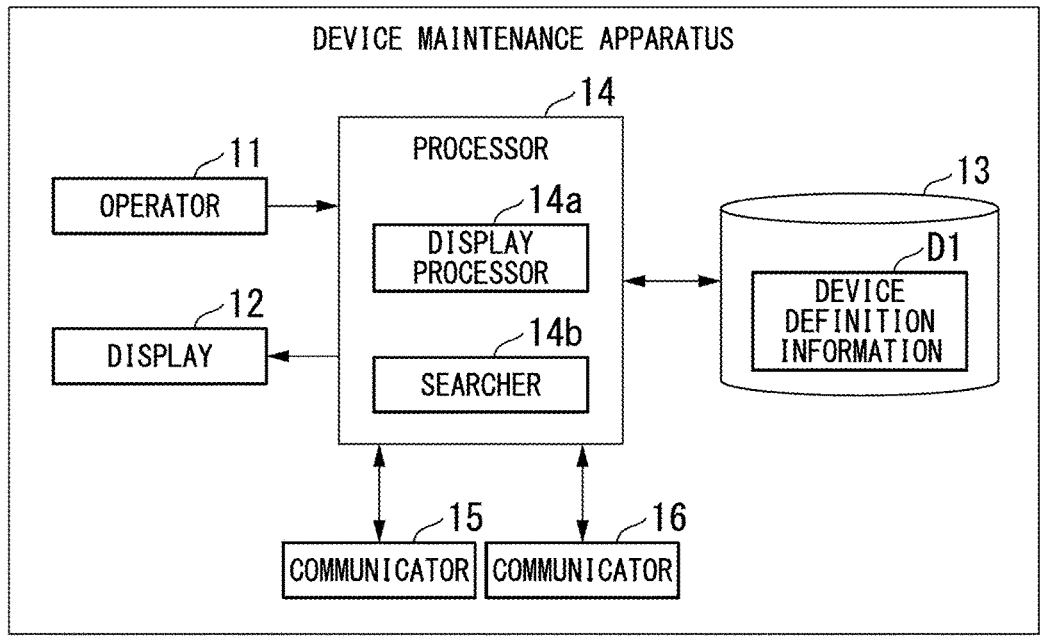
FIG. 2 is a block diagram showing a constitution of a main part of the device maintenance apparatus according to the embodiment of the present invention.

FIG. 2 is a block diagram showing a constitution of a main part of the device maintenance apparatus according to the embodiment of the present invention. As shown in FIG. 2, the device maintenance apparatus 1 in the embodiment includes an operator 11, a display 12 (a display means), a storage 13 (a storage means), a processor 14, a communicator 15 (an acquirer or an acquisition means), and a communicator 16. Such a device maintenance apparatus 1 is realized by, for example, a tablet type or laptop type personal computer.

The operator 11 includes an input apparatus such as a keyboard or a pointing device and outputs an instruction (an instruction to the device maintenance apparatus 1) according to the operation of the user who uses the device maintenance apparatus 1 to the processor 14. For example, the display 12 includes a display apparatus such as a liquid crystal display apparatus and displays various types of information output from the processor 14. The operator 11 and the display 12 may be physically separated or may be physically integrated like in a touch panel type liquid crystal display apparatus having both a display function and an operation function.

The storage 13 includes, for example, an auxiliary storage apparatus such as a hard disk drive (HDD) or a solid state drive (SSD) and stores various types of information. The storage 13 stores device definition information D1 and the like which is information having parameters of the field device FD defined therein. To be specific, the device definition information D1 is, for example, information stored in a device description (DD) file. The storage 13 may store various programs which realize functions of the device maintenance apparatus 1 and work data indicating work performed for maintaining the field device FD.

Figure 3:
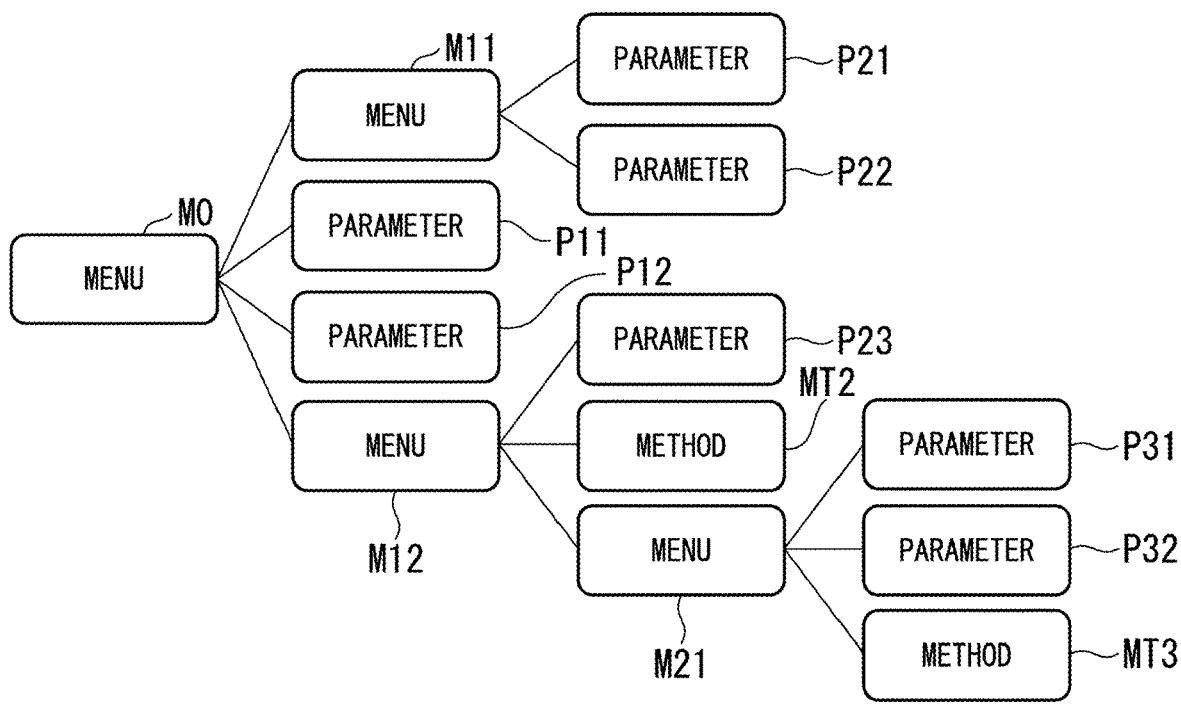
FIG. 3 is a schematic diagram of a data structure of device definition information used in the device maintenance apparatus according to the embodiment of the present invention.

FIG. 3 is a schematic diagram of a data structure of device definition information used in the device maintenance apparatus according to the embodiment of the present invention. As shown in FIG. 3, the device definition information D1 is hierarchically defined with menus, parameters of the field device FD, and methods (procedural type processing to be performed on the field device FD) associated with the maintenance of the field device FD. In the following description, when the menus, the parameters, and the methods defined in the device definition information D1 are referred to generally, the menus, the parameters, and the methods are referred to as "definition items."

As shown in FIG. 3, the above definition items (the menus, the parameters, and the methods) are linked in a tree shape with a menu MO located at the highest level as a root (a top layer). In the example shown in FIG. 3, menus M11 and M12 and parameters P11 and P12 of a first layer are linked to the menu MO which is at the root. Furthermore, parameters P21 and P22 of a second layer are linked to the menu M11 of the first layer and a menu M21, a parameter P23, and a method MT2 of the second layer are linked to the menu M12 of the first layer. In addition, parameters P31 and P32 and a method MT3 of a third layer are linked to the menu M21 of the second layer.

For example, the following information is defined for each of the definition items (the menus, the parameters, and the methods) defined in the device definition information D1.

Name of definition item
Type of definition item
State of definition item
Detailed information of definition item
Format of definition item "Name of definition item" simply indicates a name of a definition item. Examples of the name of the menu include "Detailed setup" indicating a detailed setting menu of the field device FD. Examples of the name of the parameters include "Pres Damp" indicating the responsiveness (a dumping time constant) to a flow rate change. Examples of the name of the method include "Apply values" indicating an automatic range setting.

"Type of definition item" is information which is any of the menus, the parameters, and the methods described above indicated by the definition item. "State of definition item" is information indicating a state of a definition item. Examples of the state of the definition item include "Read/Write" indicating that reading and writing are possible, "Read Only" indicating that only reading is possible, information indicating an editing state, and the like. Examples of "Detailed information of definition item" are, for example, help information in which the description of the definition item is described in detail. "Format of definition item" is information which literally indicates a format of a definition item and examples thereof include Value (numerical values and character string), Enum (a selection format), a multiple selection format, date, time, and the like.

The processor 14 performs processing according to an operation instruction input from the operator 11. The processor 14 includes a display processor 14a (display processing means) and a searcher 14b, performs a process of generating a screen to be displayed on the display 12, and searches for information included in the device definition information D1 on the basis of the instruction input from the operator 11.

The display processor 14a performs a process of generating a screen to be displayed on the display 12. To be specific, the display processor 14a performs a process of generating a screen using the device definition information D1 stored in the storage 13 and device information (parameters) of the field device FD acquired by means of the communicator 15 and displaying the generated screen on the display 12. Here, the screen generated using the display processor 14a is, for example, a screen on which a button in which information regarding the definition items (the menus, the parameters, and the methods) of the device definition information D1 described above is aggregated is displayed.

The display processor 14a generates such a screen because the parameters can thus be easily confirmed and set even when the display screen of the display apparatus provided in the display 12 has a small size. This is to improve work efficiency. Furthermore, the display processor 14a also performs a process of generating a screen showing the found results of the searcher 14b. Details of the screen generated using the display processor 14a will be described later.

The searcher 14b performs a simple search or a detailed search for the information included in the device definition information D1 on the basis of the instruction input from the operator 11. Here, the simple search is a search performed using the names of the definition items (the menus, the parameters, and the methods) of the device definition information D1 as search targets. The detailed search is a search performed using detailed information as a search target in addition to the names of the definition items (the menus, the parameters, and the methods) of the device definition information D1.

The communicator 15 communicates with the field device FD connected via the communication cable CB under the control of the processor 14. The communicator 15, for example, communicates with the field device FD to acquire device information (parameters) of the field device FD. The communicator 16 communicates over a network (not shown) under the control of the processor 14. For example, the communicator 16 communicates with a server apparatus (not shown) installed in a plant over a wireless network constructed in the plant. The device maintenance apparatus 1 communicates with the server apparatus and uploads, for example, maintenance information of the field device FD to the server apparatus.

The functions of the device maintenance apparatus 1 (for example, the functions of the display processor 14a and the searcher 14b realized using the processor 14) are realized through software, for example, by installing a program which realizes those functions. That is to say, the function of the device maintenance apparatus 1 is realized in cooperation with software and hardware resources.

A program which realizes the function of the device maintenance apparatus 1 (or a program which updates the function of the device maintenance apparatus 1) may be distributed in a state of being recorded on a computer-readable recording medium such as a CD-ROM or a DVD (registered trademarks)-ROM or may be distributed over a network such as the Internet. Alternatively, the program may be downloaded from the server apparatus described above. The function of the device maintenance apparatus 1 may be realized using hardware such as a field-programmable gate array (FPGA), a large scale integration (LSI), and an application specific integrated circuit (ASIC).

Figure 4A:
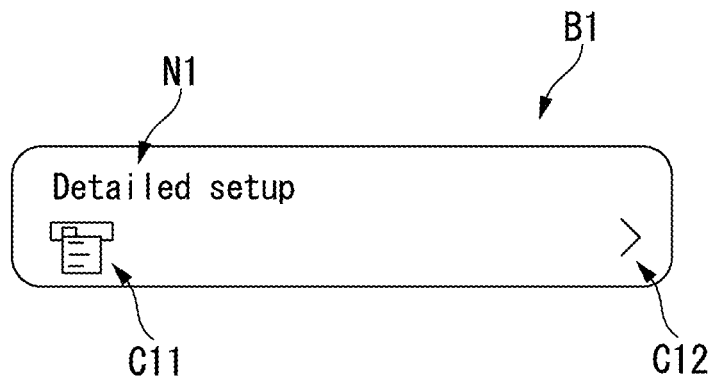
FIGS. 4A to 4C are diagrams for explaining a button displayed in the device maintenance apparatus according to the embodiment of the present invention.
Figure 4B:
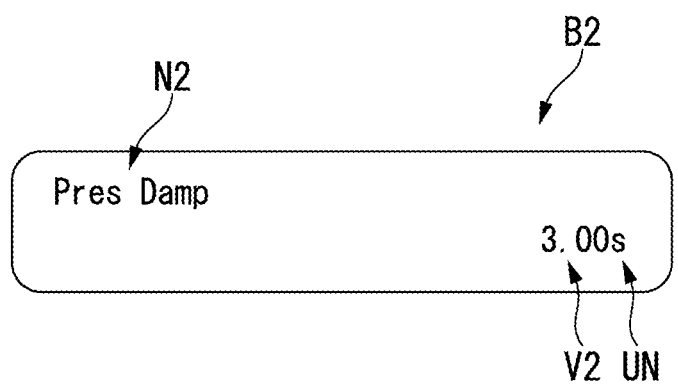
Figure 4C:
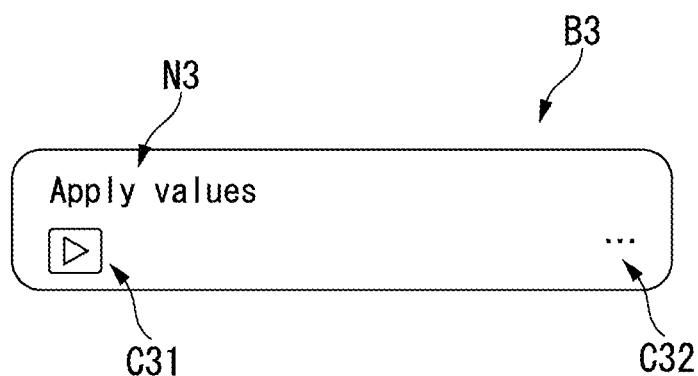

FIGS. 4A to 4C are diagrams for explaining a button displayed on the device maintenance apparatus according to the embodiment of the present invention. FIG. 4A is a diagram showing a menu button B1 (a second button) associated with the above-described menu. FIG. 4B is a diagram showing a parameter button B2 (a first button) associated with the above-described parameters. FIG. 4C is a diagram showing a method button B3 (a third button) associated with the above-described method.

These buttons are basically generated using the display processor 14a on the basis of the device definition information D1 stored in the storage 13. Whether the button generated using the display processor 14a is the menu button B1, the parameter button B2, or the method button B3 is defined on the basis of "Type of definition item" in each definition item of the device definition information D1.

As shown in FIGS. 4A to 4C, the menu button B1, the parameter button B2, and the method button B3 are buttons having the same shape (a horizontally elongated substantially rectangular shape) and having the same size. Here, the menu button B1, the parameter button B2, and the method button B3 have different attached information and assigned function.

As shown in FIG. 4A, the menu button B1 is a button having a name N1 of a menu attached in the upper left corner, an icon C11 attached in the lower left corner, and an icon C12 attached in the lower right corner. In the example shown in FIG. 4A, "Detailed setup" is attached as the name N1 of the menu, a figure intuitively indicating that the figure is a menu is attached as the icon C11, and a symbol ">" indicating that a transition to a one-lower-ordered layer is performed is attached as the icon C12.

Also, a function of transitioning the display details of the display 12 to the display details of a different layer (a one-lower-ordered layer) when the menu button B1 is subjected to an operation (pressed) is assigned to the menu button B1. To be specific, a function of transitioning a screen to a screen on which a button indicating definition items (menus, parameters, and methods) in the one-lower-ordered layer linked to the menu specifically identified through the name N1 attached to the menu button B1 is displayed is assigned to the menu button B1. A color of the menu button B1 is assigned on the basis of "State of definition item" defined in the definition item of the device definition information D1.

As shown in FIG. 4B, the parameter button B2 is a button having a name N2 of a parameter attached in the upper left corner and a numerical value V2 and a unit UN of the parameter attached in the lower right corner. In the example shown in FIG. 4B, "Pres Damp" is attached as the name N2 of the parameter, "3.00" is attached as the numerical value V2, and "s (seconds)" is attached as the unit UN.

Also, a function of transitioning a screen to a screen on which the details of the parameter are displayed when the parameter button B2 is subjected to an operation (pressed) is assigned to the parameter button B2. A color of the parameter button B2 is assigned on the basis of "State of definition item" defined in the definition item of the device definition information D1 as in the menu button B1. For example, when "State of definition item" is "Read/Write" indicating that reading and writing are possible, light green is assigned as the color of the parameter button B2. Alternatively, when "State of definition item" is "Read Only" indicating that only reading is possible, gray is assigned as the color of the parameter button B2.

As shown in FIG. 4C, the method button B3 is a button having a name N3 of a method attached in the upper left corner, an icon C31 attached in the lower left corner, and an icon C32 attached in the lower right corner. In the example shown in FIG. 4C, "Apply values" is attached as the name N3 of the menu, a figure intuitively indicating procedural type processing which can be performed is attached as the icon C31, and a symbol " . . . " indicating that a process is performed is attached as the icon C32.

Also, a function of causing the field device FD to perform the procedural type processing when the method button B3 is subjected to an operation (pressed) is assigned to the method button B3. To be specific, a function of performing the procedural type processing specifically identified through the name N3 attached to the method button B3 is assigned to the method button B3. A color of the method button B3 is assigned on the basis of "State of definition item" defined in the definition item of the device definition information D1.

Display modes shown in FIGS. 4A to 4C are merely examples and display modes of the menu button B1, the parameter button B2, and the method button B3 may be other display modes. The menu button B1, the parameter button B2, and the method button B3 may be displayed as a cohesive display mode in which an operation is possible. For example, various types of information (for example, a name, a numerical value, and the like) attached to each button may be displayed in a pop-up, and the various types of information may be expanded and displayed (or the expanded and displayed button may be a foldable menu).

Figure 5:
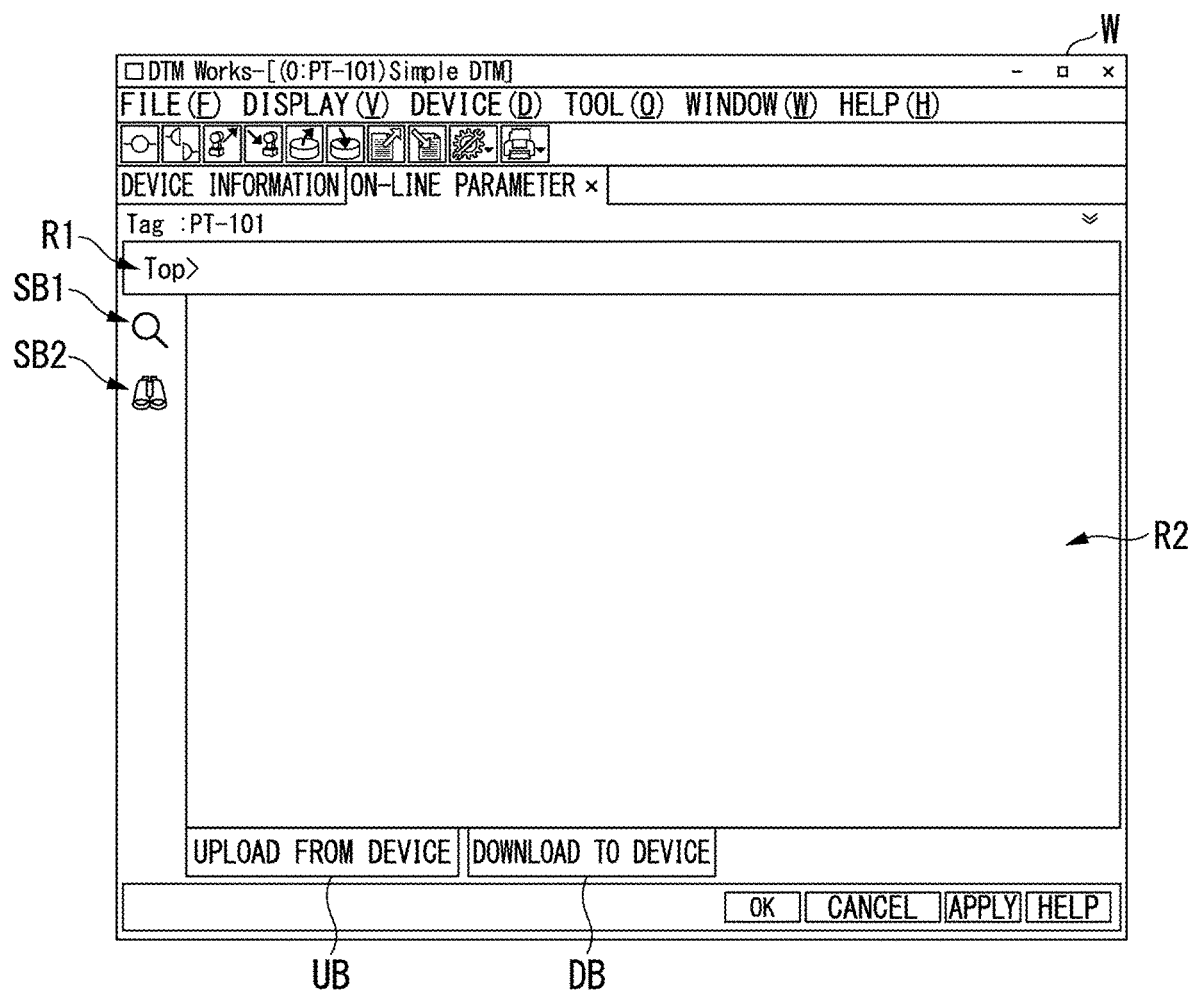
FIG. 5 is a diagram showing an example of details displayed in the device maintenance apparatus according to the embodiment of the present invention.

FIG. 5 is a diagram showing an example of the details displayed in the device maintenance apparatus according to the embodiment of the present invention. As shown in FIG. 5, a window W having a menu route display field R1, an information display field R2, a simple search button SB1, a detailed search button SB2, an upload button UB, a download button DB, and the like provided therein is displayed on the display 12 of the device maintenance apparatus 1 in the embodiment. For example, the window W may be displayed when a power supply of the device maintenance apparatus 1 is turned on, may be displayed when a display instruction is provided from a user of the device maintenance apparatus 1, or may be displayed when the field device FD is connected to the device maintenance apparatus 1.

The menu route display field R1 is a field in which a menu following a user's operation is displayed. For example, in a case in which the menu is defined in the device definition information D1 stored in the storage 13 as shown in FIG. 3, when the user follows the menus M12 and M21 in order from the menu MO which is at the root, the name of the menu MO (Top), the name of the menu M12, and the name of the menu M21 are displayed in order in the menu route display field R1. It should be noted that a menu tree is not displayed in the menu route display field R1 as in the related art and only the menu following a user's operation is displayed.

The information display field R2 is a field having the menu button B1 described with reference to FIG. 4A, the parameter button B2 described with reference to FIG. 4B, the method button B3 described with reference to FIG. 4C, and the like displayed therein. Only one of the menu button B1, the parameter button B2, and the method button B3 may be displayed in the information display field R2 in some cases, and a combination of any two or more of the menu button B1, the parameter button B2, and the method button B3 may be displayed in some cases. A specific display example of the information display field R2 will be described later.

The simple search button SB1 is a button which causes the device maintenance apparatus 1 to perform a simple search for the information included in the device definition information D1. The detailed search button SB2 is a button which causes the device maintenance apparatus 1 to perform a detailed search for the information included in the device definition information D1. As described above, the simple search is a search performed using, as a search target, the name of the definition item of the device definition information D1 and the detailed search is a search performed using, as a search target, detailed information, in addition to the name of the definition item of the device definition information D1.

The upload button UB is a button for causing the device maintenance apparatus 1 to acquire (upload) device information from the field device FD. The download button DB is a button for causing the device maintenance apparatus 1 to set (download) device information for the field device FD.

<Device Maintenance Method>

Figure 6:
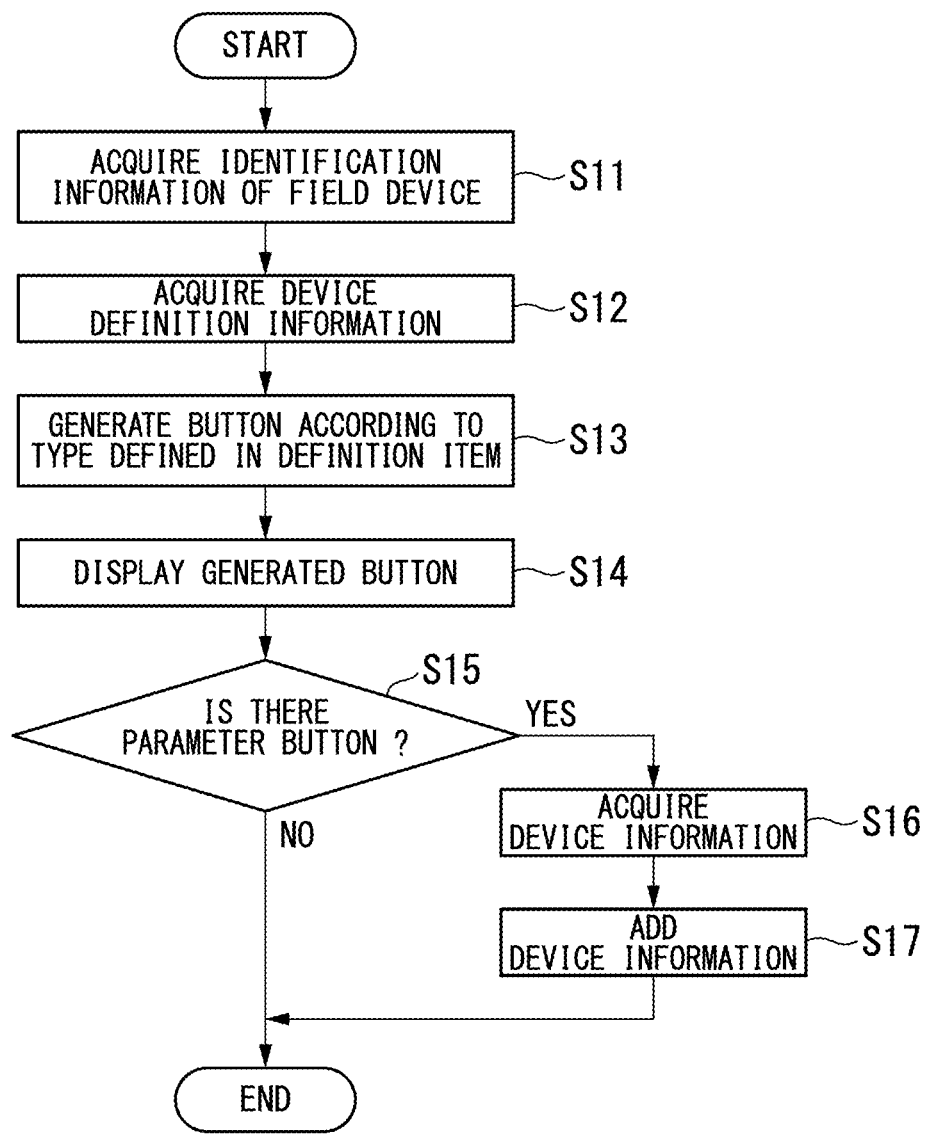
FIG. 6 is a flowchart showing an example of a device maintenance method according to an embodiment of the present invention.

FIG. 6 is a flowchart for describing an example of a device maintenance method according to the embodiment of the present invention. The processing of the flowchart shown in FIG. 6 is started, for example, when an instruction is provided from a user of the device maintenance apparatus 1 in a state in which the field device FD is connected to the device maintenance apparatus 1. Furthermore, the processing of the flowchart shown in FIG. 6 is also started when a user performs an operation on the button displayed in the information display field R2 of the window W shown in FIG. 5.

If the processing of the flowchart shown in FIG. 6 is started, first, the processor 14 performs a process of acquiring identification information (for example, tag information) of the field device FD (Step S11). To be specific, the processor 14 controls the communicator 15 to communicate with the field device FD connected via the communication cable CB and to perform a process of acquiring identification information set in the field device FD. In a case in which the processing of the flowchart shown in FIG. 6 is repeatedly performed, when the identification information of the field device FD has been acquired in advance, the process of Step S11 is omitted.

Subsequently, the processor 14 performs a process of acquiring the device definition information D1 stored in the storage 13 of the device maintenance apparatus 1 (Step S12). To be specific, a process of acquiring device definition information D1 in the device definition information D1 stored in the storage 13 which is associated with the field device FD identified by identification information acquired in Step S11 is performed. Subsequently, the device definition information D1 acquired using the processor 14 is delivered to the display processor 14a and the display processor 14a performs a process of generating a button in accordance with "Type of definition item" defined in the definition item of the device definition information D1 (Step S13).

For example, when "Type of definition item" defined in the definition item of the device definition information D1 is in the menu, as shown in FIG. 4A, a process of generating the menu button B1 having the name N1 of the menu attached in the upper left corner, the icon C11 attached in the lower left corner, and the icon C12 attached in the lower right corner is performed. Here, information regarding the display mode of the icons C11 and C12 is registered in "Type of definition item" in advance, and the display processor 14a performs a process of acquiring information regarding the display mode registered in "Type of definition item," and generating the menu button B1 on the basis of this information. The color of the menu button B1 is assigned on the basis of "State of definition item" defined in the definition item of the device definition information D1.

Also, for example, when "Type of definition item" defined in the definition item of the device definition information D1 is a parameter, as shown in FIG. 4B, a process of generating the parameter button B2 having the name N2 of the parameter attached in the upper left corner is performed. When the parameter button B2 is generated, in a case in which the device information of the field device FD is not acquired, the numerical value V1 and the unit UN of the parameter in the lower right corner of the parameter button B2 is not attached.

While the device information of the field device FD is being acquired, an icon indicating that the numerical value V1 and the unit UN of the parameter are being read is attached in the lower right corner of the parameter button B2. Furthermore, the color of the parameter button B2 is assigned on the basis of "State of definition item" defined in the definition item of the device definition information D1.

Also, for example, when "Type of definition item" defined in the definition item of the device definition information D1 is a method, as shown in FIG. 4C, a process of generating the method button B3 having the name N3 of the method attached in the upper left corner, the icon C31 attached in the lower left corner, and the icon C32 attached in the lower right corner is performed. Here, information regarding the display mode of the icons C31 and C32 is registered in "Type of definition item" in advance, and the display processor 14a performs a process of registering the information regarding the display mode registered in "Type of definition item," and generating the method button B3 on the basis of this information. The color of the method button B3 is assigned on the basis of "State of definition item" defined in the definition item of the device definition information D1.

If a process of generating a button according to "Type of definition item" defined in the definition item of the device definition information D1 is completed, a process of displaying the generated button in the information display field R2 of the window W shown in FIG. 5 is performed (Step S14).

Subsequently, the display processor 14a performs a process of performing a determination concerning whether the button displayed in the information display field R2 of the window W shown in FIG. 5 includes the parameter button B2 (Step S15). When it is determined that the parameter button B2 is not included (when the determination result in Step S15 is "NO"), the series of processes shown in FIG. 6 end.

On the other hand, when it is determined that the parameter button B2 is included (when the determination result in Step S15 is "YES"), the processor 14 performs the process of controlling the communicator 15 to acquire the device information from the field device FD (Step S16). The device information acquired using the processor 14 is delivered to the display processor 14a. Moreover, the display processor 14a performs a process of adding device information to the parameter button B2 displayed in the information display field R2 of the window W shown in FIG. 5 (Step S17).

To be specific, as shown in FIG. 4B, a process of adding the numerical value V1 and the unit UN of the parameter in the lower right corner of the parameter button B2 is performed. When an icon indicating that the numerical value V1 and the unit UN of the parameter are being read is attached to the lower right corner of the parameter button B2, a process of adding the numerical value V1 and the unit UN of the parameter instead of this icon is performed.

In the example shown in FIG. 6, with regard to the parameter button B2, the parameter button B2 having only the name N2 of the parameter attached thereto is generated and displayed (Steps S13 and S14) and then the device information is added to the parameter button B2 (Step S17). However, for example, the device information may be acquired in addition to the identification information of the field device FD in the process of Step S11 and the parameter button B2 having the name N2 of the parameter and the device information (the numerical value V1 and the unit UN of the parameter) attached thereto may be generated and displayed (Steps S13 and S14).

<Display Example>

Figure 7A:
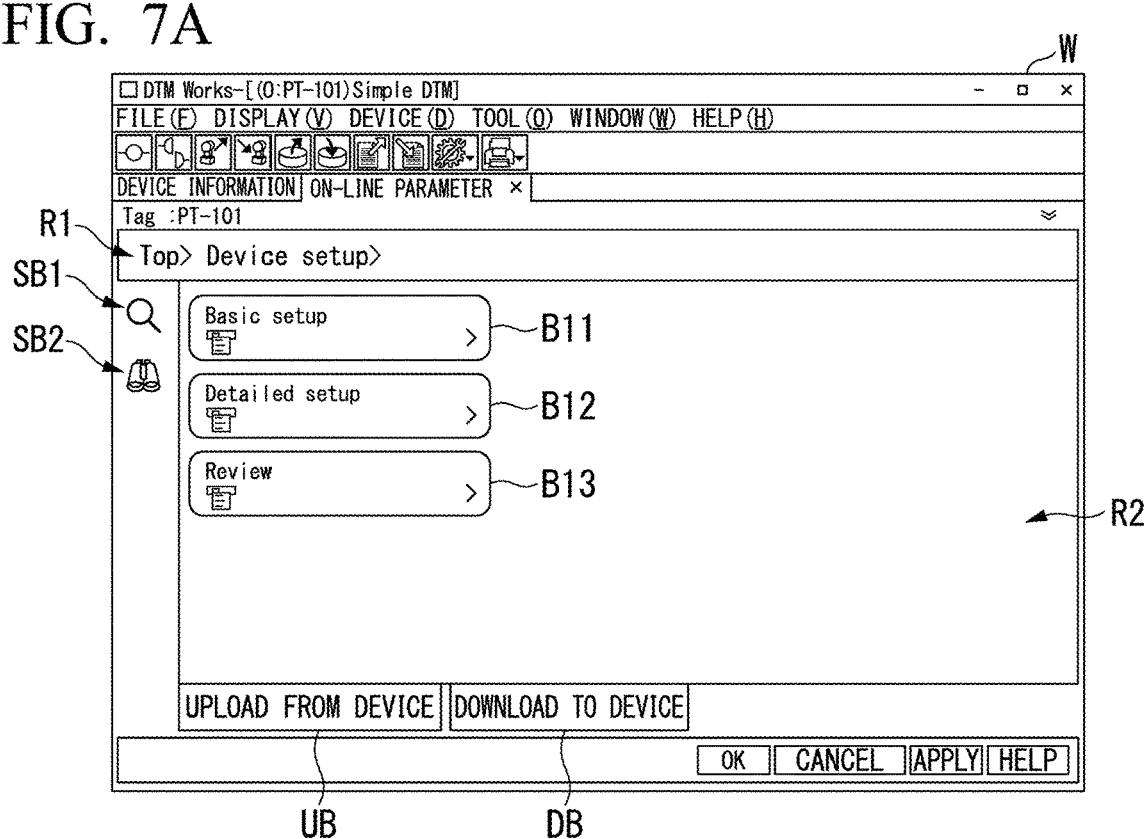
FIGS. 7A and 7B are diagrams showing a first display example of a button in an embodiment of the present invention.
Figure 7B:
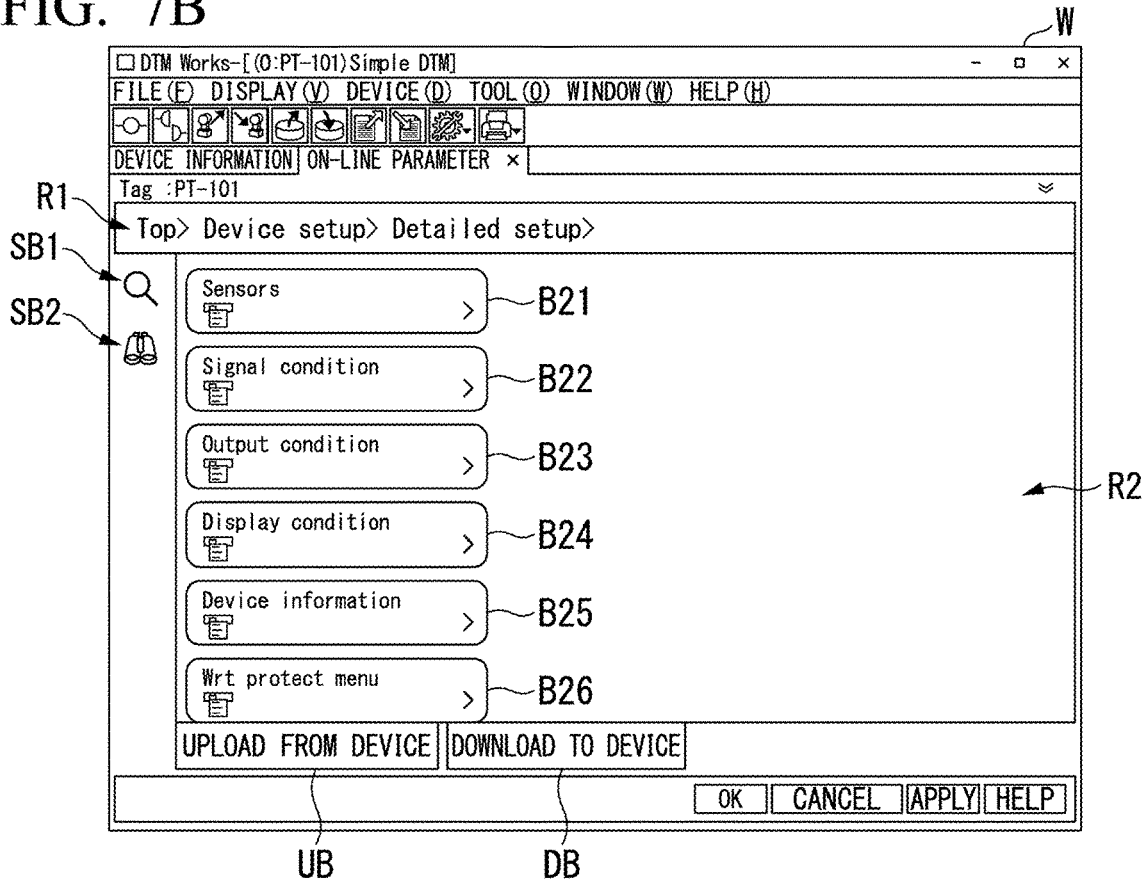

FIGS. 7A and 7B are diagrams showing a first display example of a button in the embodiment of the present invention. The display example shown in FIG. 7A is a display example when the menu "Device setup" is followed from the menu "Top" in response to a user's operation of the device maintenance apparatus 1 (refer to the menu route display field R1). In this example, the menu button B11 having the name "Basic setup" attached thereto, the menu button B12 having the name "Detailed setup" attached thereto, and the menu button B13 having the name "Review" attached thereto are displayed in the information display field R2 of the window W. The menu buttons B11 to B13 are displayed in the information display field R2 of the window W in a state of being arranged in a vertical row at regular intervals.

The display example shown in FIG. 7B is a display example when the menu button B12 (the second button) shown in FIG. 7A is operated in response to a user's operation of the device maintenance apparatus 1. If the menu button B12 is operated, the name (Detailed setup) of the operated menu button B12 is added to the menu route display field R1 of the window W. Furthermore, the display of the information display field R2 of the window W transitions (switches) to the display having menu buttons B21 to B26.

These menu buttons B21 to B26 are menu buttons for the menu in the one-lower-ordered layer linked to the menu specifically identified through the name "Detailed setup" attached to the menu button B12 operated by a user. That is to say, the display processor 14a transitions to the display of the menu buttons for the menu in the one-lower-ordered layer. In FIG. 7B, six menu buttons B21 to B26 are displayed in the information display field R2 of the window W in a state of being arranged in a vertical row at regular intervals. When many menu buttons to be displayed in the information display field R2 of the window W are provided, only some of the menu buttons may be displayed in the information display field R2 and the other of the menu buttons may be displayed in the information display field R2 in a scrolling way. FIG. 7B shows an example in which only the menu button is displayed. However, at least one of the parameter or the method button may be displayed or only the parameter button or only the method button may be displayed, in addition to the menu button.

Figure 8A:
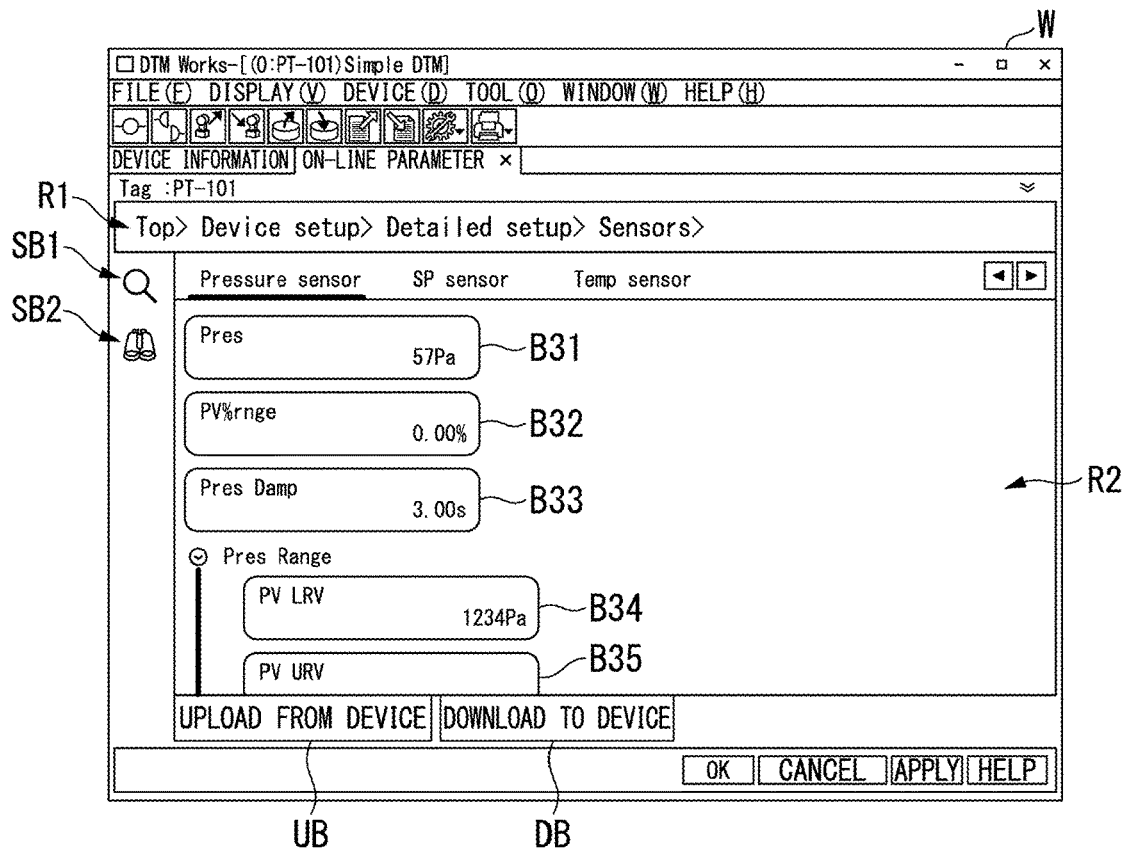
FIGS. 8A and 8B are diagrams showing a second display example of a button in the embodiment of the present invention.
Figure 8B:
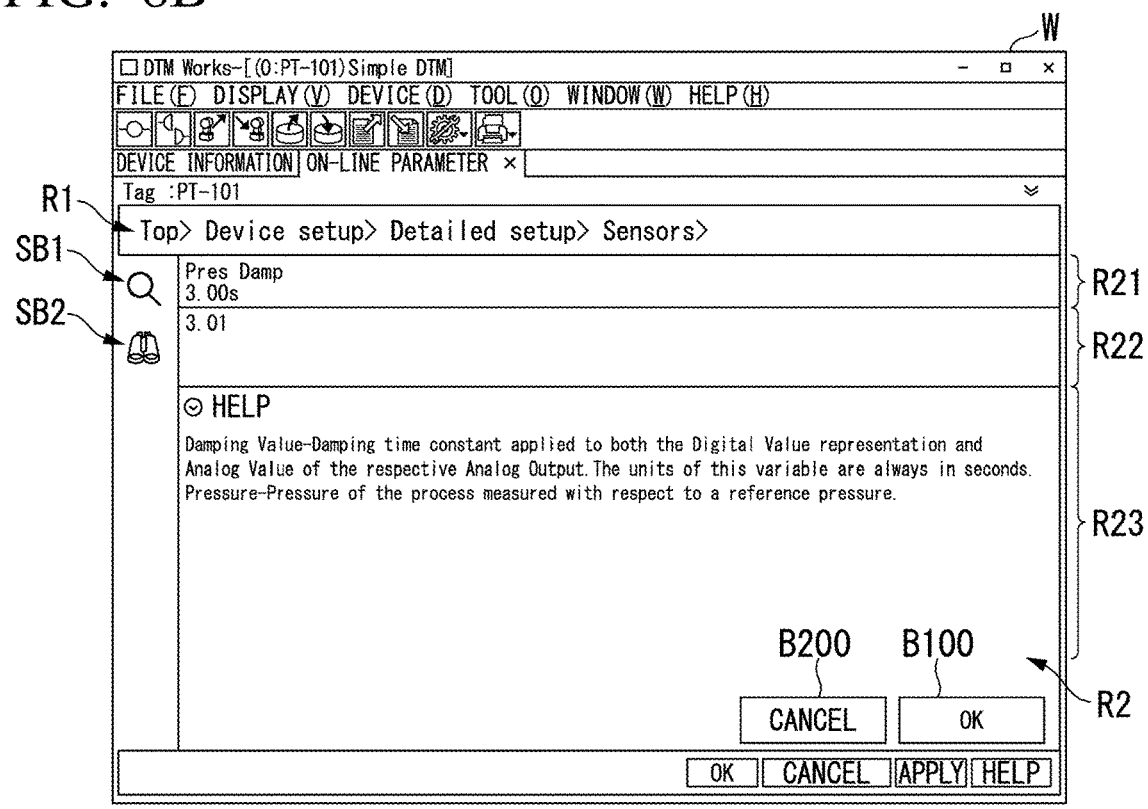
Figure 9:
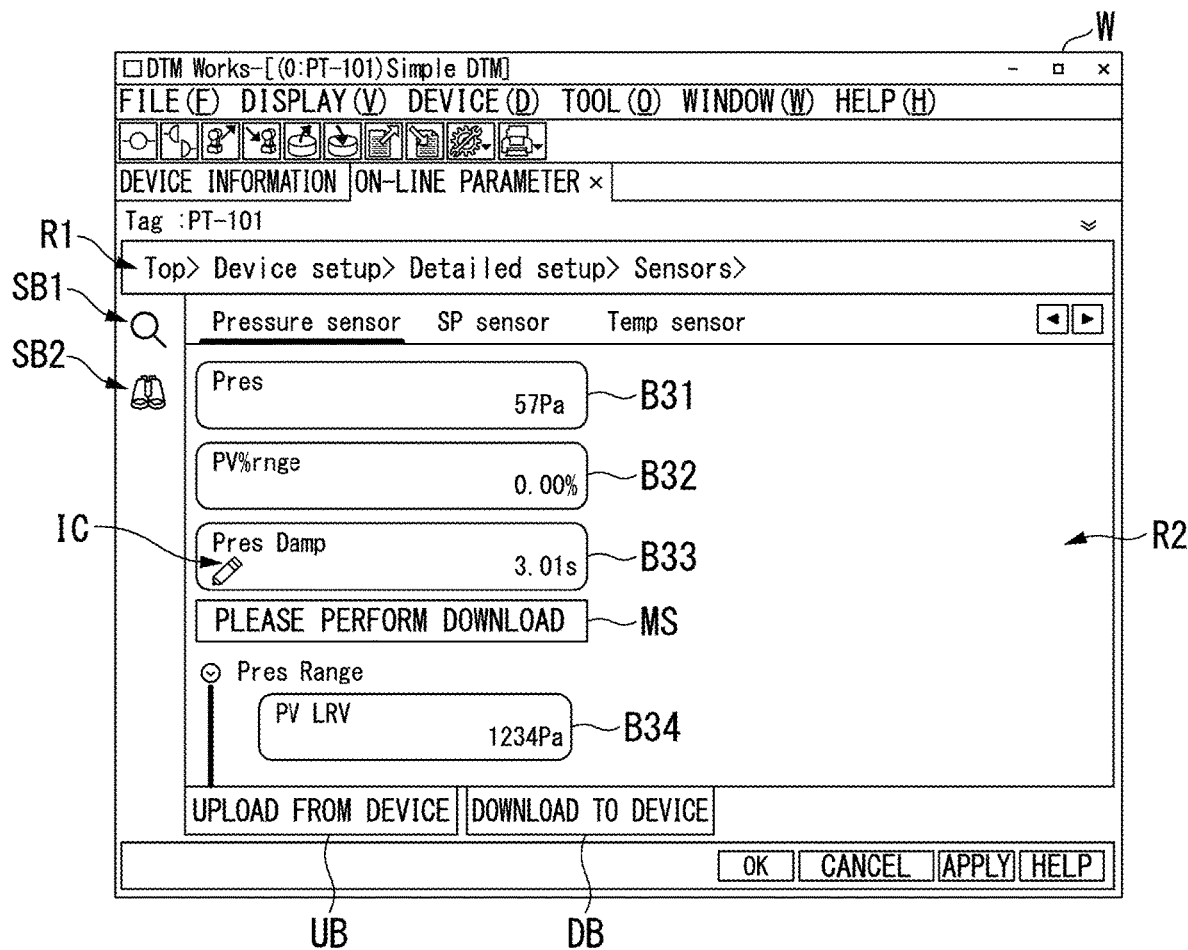
FIG. 9 is a diagram showing the second display example of a button in the embodiment of the present invention.

FIGS. 8A, 8B, and 9 are diagrams showing a second display example of the button in the embodiment of the present invention. The display example shown in FIG. 8A is a display example when the menu button B12 having the name "Detailed setup" attached thereto shown in FIG. 7A is operated and then a menu button (not shown) having the name "Sensors" attached thereto is operated in response to a user's operation of the device maintenance apparatus 1 (refer to the menu route display field R1). In this example, five parameter buttons B31 to B35 (the first buttons) are displayed in the information display field R2 of the window W.

The parameter button B31 is a button having the name "Pres" attached thereto, the parameter button B32 is a button having the name "PV % rnge" attached thereto, and the parameter button B33 is a button having the name "Pres Damp" attached thereto. Also, the parameter button B34 is a button having the name "PV LRV" attached thereto and the parameter button B35 is a button having the name "PV URV" attached thereto. Numerical values and units of parameters included in device information obtained from the field device FD are attached to the lower right corners of the parameter buttons B31 to B36.

In the example shown in FIG. 8A, the parameter buttons B31 and B32 are displayed in gray. This is because "State of definition item" in the parameter of the name "Pres" and the parameter of the name "PV % rnge" is "Read Only." On the other hand, the parameter buttons B33 to B35 are displayed in light green. This is because "State of definition item" in the parameter of the name "Pres Damp", the parameter of the name "PV LRV," and the parameter for the name "PV URV" is "Read/Write."

The display example shown in FIG. 8B is a display example when the parameter button B33 shown in FIG. 8A is operated in response to a user's operation of the device maintenance apparatus 1. If the parameter button B33 is operated, the display of the information display field R2 of the window W transitions (switches) to the display having the details of a parameter having a name on the parameter button B33. That is to say, the display processor 14a causes a display to transition to a display having the details of the parameter.

In the example shown in FIG. 8B, the information display field R2 of the window W is switched to a field having an outline display field R21, a parameter edition field R22, and a detailed information display field R23 provided therein. The outline display field R21 is a field in which information (an outline) attached to the parameter button B33 operated by a user is displayed. In the example shown in FIG. 8B, "Pres Damp" is displayed as the name of the parameter, "3.00" is displayed as the numerical value, and "s (seconds)" is displayed as the unit.

The parameter edition field R22 is a field used at the time of editing the numerical value of the parameter. For example, the numerical value of the parameter to be newly set in the field device FD is input to the parameter edition field R22 according to a user's instruction. The detailed information display field R23 is a field in which detailed information (for example, help information) of a parameter having a name on the parameter button B33 operated by a user is displayed. The information defined in "Detailed information of definition item" in the parameter having a name on the parameter button B33 operated by a user is displayed in the detailed information display field R23 using the display processor 14a.

When a user does not edit the parameter in a state in which the display shown in FIG. 8B is provided (when an OK button B100 is operated without inputting a numerical value in the parameter edition field R22 or a cancel button B200 is operated), the display returns to the display of FIG. 8A. On the other hand, when a user edits the parameter in a state in which the display shown in FIG. 8B is provided (when a numerical value is input to the parameter edition field R22 and the OK button B100 is operated), the display shown in FIG. 9 is provided.

The display example shown in FIG. 9 is a display example when the parameter is edited in response to a user's operation of the device maintenance apparatus 1. As shown in FIG. 9, a plurality of parameter buttons (the parameter buttons B31 to B34 in the example shown in FIG. 9) are displayed in the information display field R2 of the window W as in FIG. 8A. Here, an icon IC which intuitively indicates that the parameter has been edited is attached to the lower left corner of the parameter button B33 for the edited parameter and the parameter button B33 is displayed in a different color (for example, red) to call attention.

In addition, a message MS "Please perform a download" prompting to set the edited parameter to the field device FD is displayed in association with the parameter button B33. If a user of the device maintenance apparatus 1 operates the download button DB of the window W, the edited parameter is set (downloaded) in the field device FD through the processing of the processor 14.

Figure 10A:
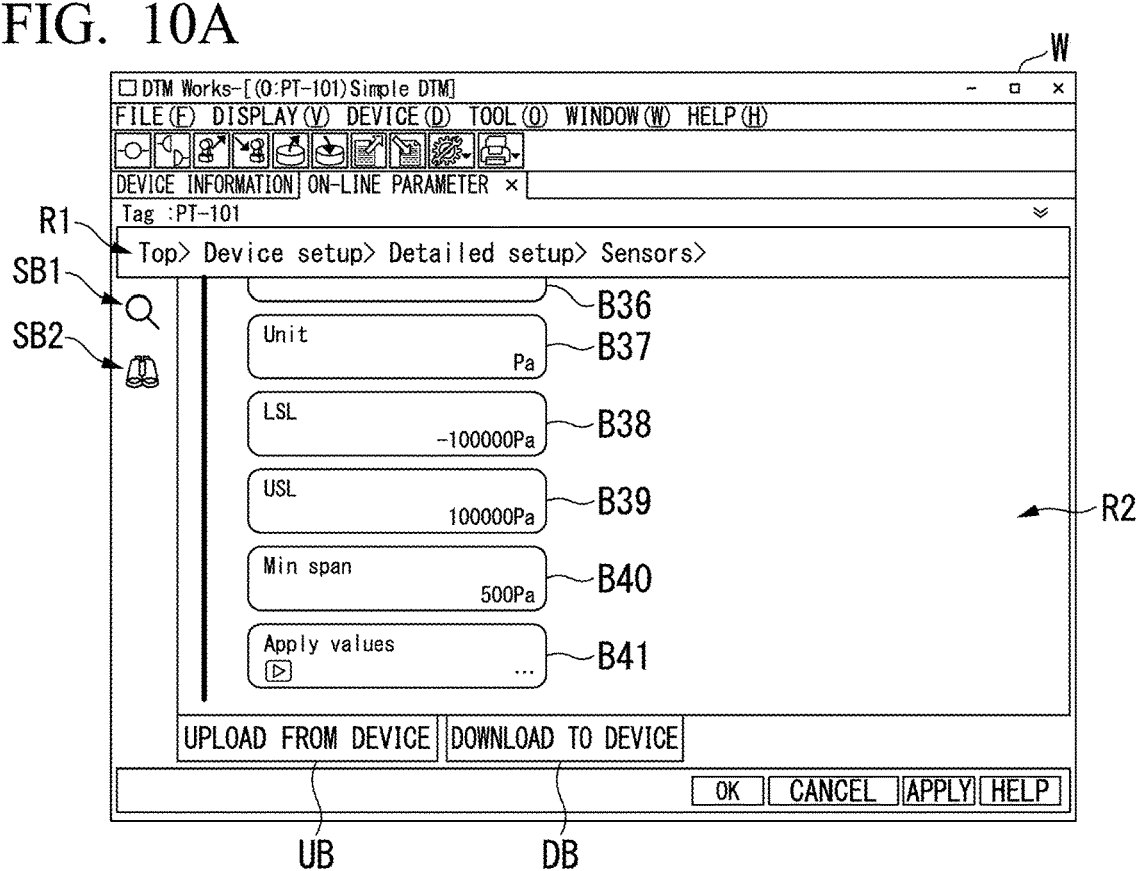
FIGS. 10A and 10B are diagrams showing a third display example of the button in the embodiment of the present invention.
Figure 10B:
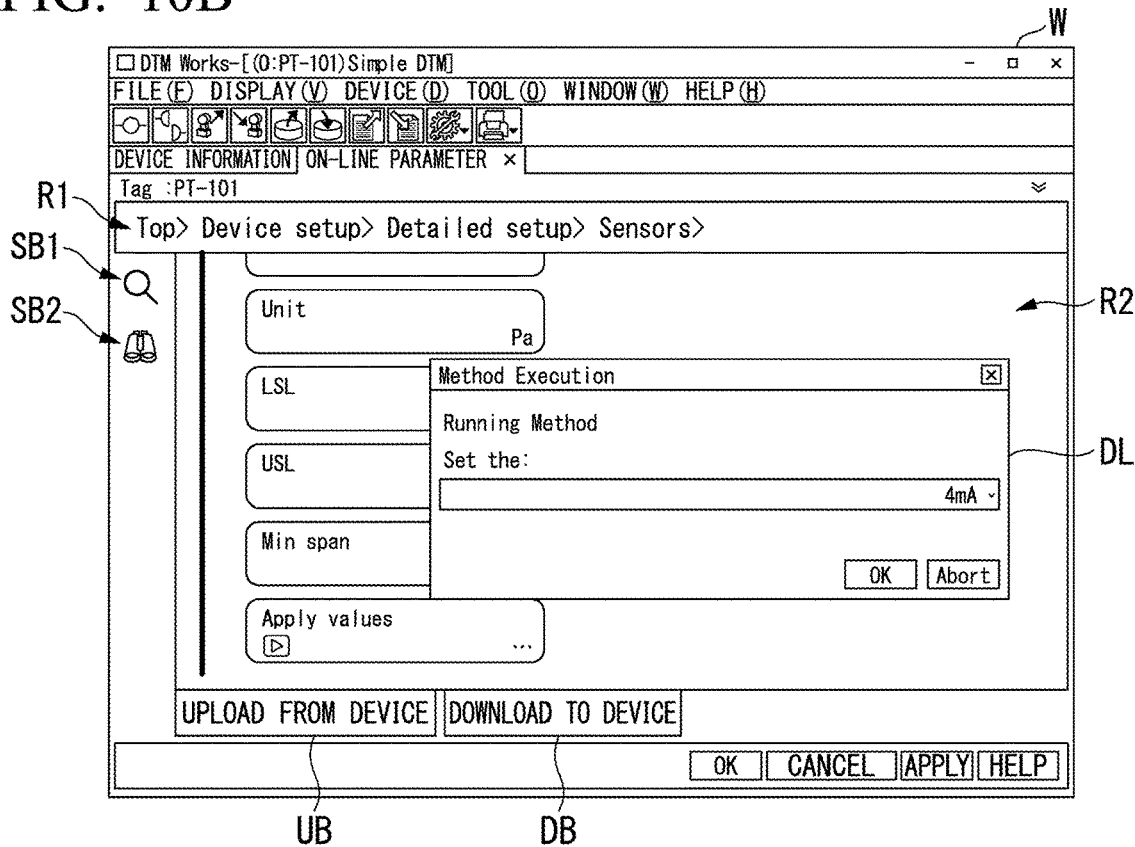

FIGS. 10A and 10B are diagrams showing a third display example of the button in the embodiment of the present invention. The display example shown in FIG. 10A is a display example when the menu button B12 having the name "Detailed setup" attached thereto shown in FIG. 7A is operated and then a menu button (not shown) having the name "Sensors" attached thereto is operated as in FIG. 8A (refer to the menu route display field R1). In this example, five parameter buttons B36 to B40 and one method button B41 (the third button) are displayed in the information display field R2 of the window W. The parameter buttons B36 to B40 and the method button B41 are displayed in the information display field R2 of the window W in a state of being arranged in a vertical row at regular intervals.

The display example shown in FIG. 10B is a display example when the method button B41 shown in FIG. 10A is operated in response to a user's operation of the device maintenance apparatus 1. If the method button B41 is operated, the method (Apply values) having a name on the method button B41 is performed using the processor 14 and a dialog box DL indicating the execution state is displayed. If the execution of the method is completed, a dialog box BL is deleted.

Figure 11:
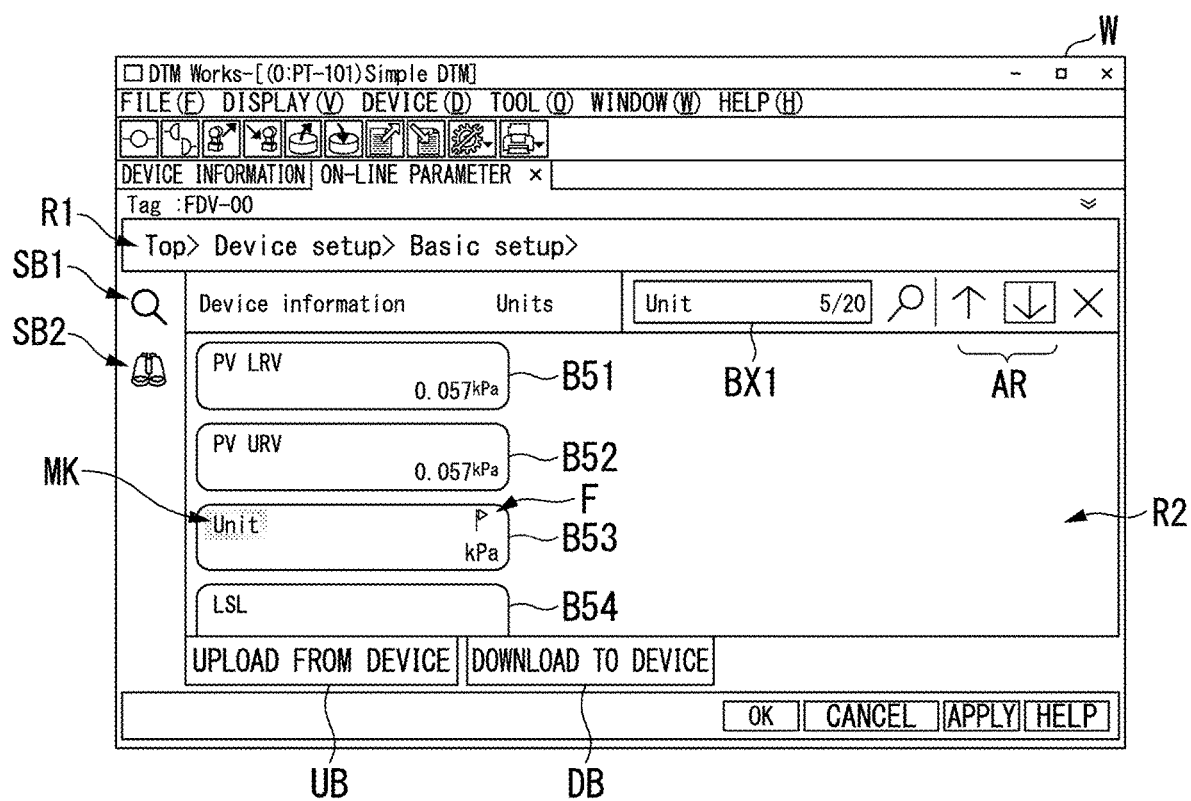
FIG. 11 is a diagram showing a display example at the time of a simple search in an embodiment of the present invention.

FIG. 11 is a diagram showing a display example at the time of a simple search according to the embodiment of the present invention. In the example shown in FIG. 11, the menu "Device setup" and the menu "Basic setup" are followed from the menu "Top" in response to a user's operation of the device maintenance apparatus 1 (refer to the menu route display field R1). Moreover, in the information display field R2 of the window W, the parameter buttons B51 to B54 are displayed in a vertically arranged state at regular intervals.

If a user of the device maintenance apparatus 1 operates the simple search button SB1 provided in the window W, a search box BX1 (an inputter) is displayed in the window W.

If a user of the device maintenance apparatus 1 inputs a search key (search information) to the search box BX1, the searcher 14b of the device maintenance apparatus 1 performs a search using, a search target, "Name of definition item" defined in each definition item of the device definition information D1. If the search (the simple search) using the searcher 14b is completed, the display processor 14a performs a process of displaying, in different modes, a button having a name found using the searcher 14b among the buttons displayed in the information display field R2 of the window W.

As exemplified in FIG. 11, it is assumed that "Unit" is input as a search key in the search box BX1 of the window W. Thus, with regard to the parameter button B53 having the name "Unit" attached thereto of the parameter buttons B51 to B54 displayed in the information display field R2 of the window W, for example, the name "Unit" is highlighted by assigning a fluorescent color marker MK to the background of the name "Unit." Furthermore, an icon F which intuitively indicates that the search key is the found definition item is attached to the parameter button B53. In this way, when the parameter button B53 having a name which matches the search key (or includes the search key) attached thereto is displayed in a manner different from that of other parameter buttons, it is possible to easily recognize the parameter button B53 which matches the search in a short time.

If the search using the searcher 14b is completed, the search box BX1 displays information indicating an outline of the search results. In the example shown in FIG. 11, the search result "5/20" is displayed. This indicates that the total number of buttons having names including the search key "Unit" is "20" and that the parameter button B53 displayed in the information display field R2 is a fifth button. When a user of the device maintenance apparatus 1 operates an arrow button AR provided on a right side of the search box BX1, a previous button or the next button having the name including the search key "Unit" can be displayed in the information display field R2 using the display processor 14a on the basis of the search result.

Figure 12A:
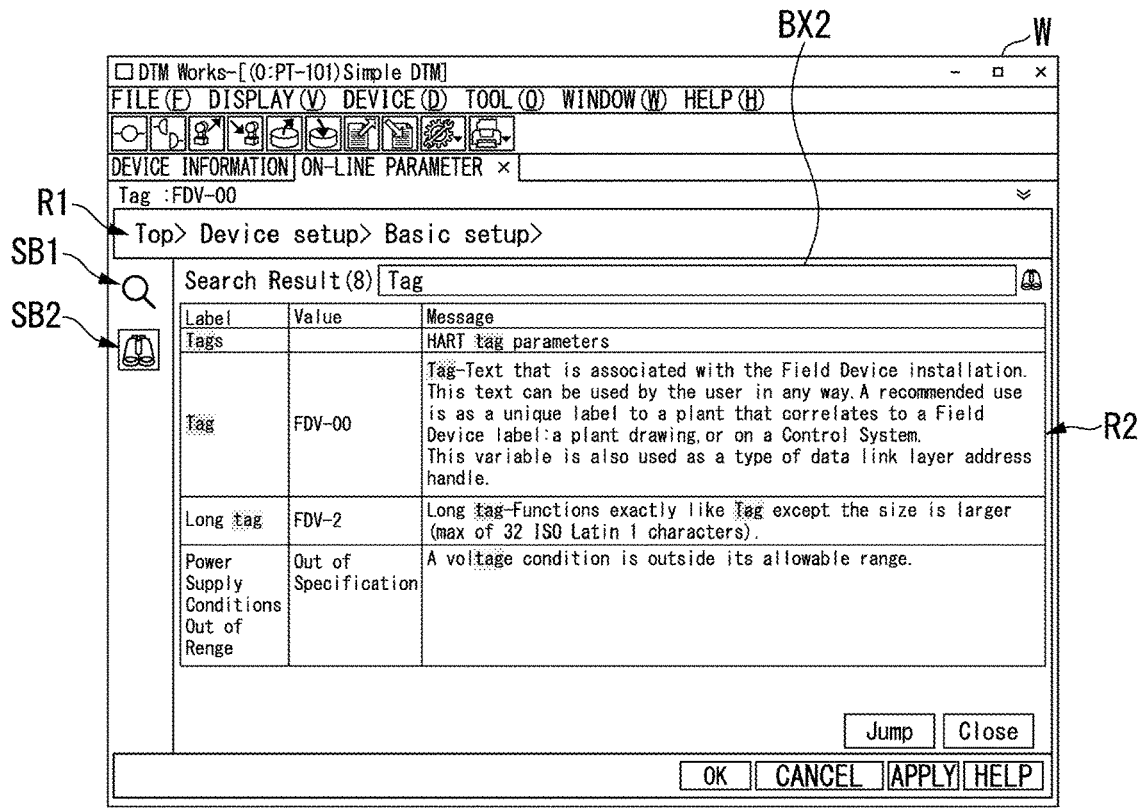
FIGS. 12A and 12B are diagrams showing a display example at the time of a detailed search in an embodiment of the present invention.
Figure 12B:
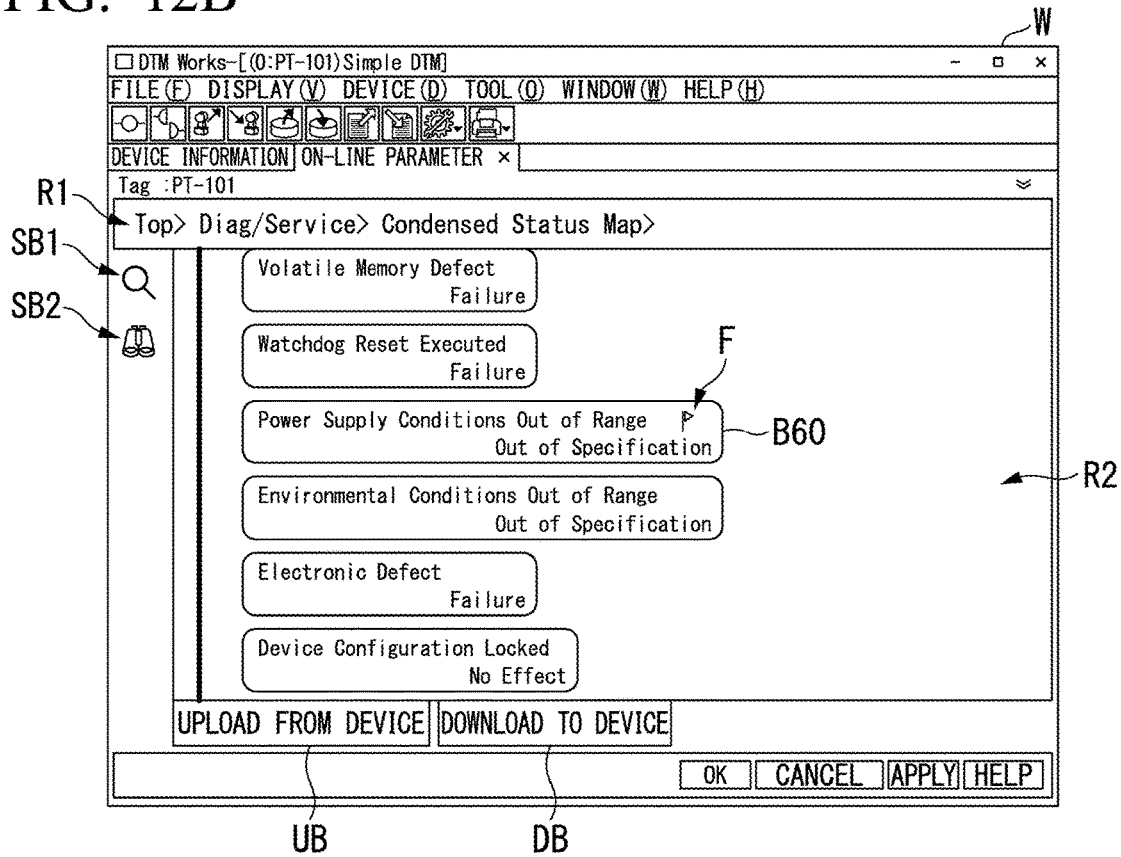

FIGS. 12A and 12B are diagrams showing a display example at the time of a detailed search according to the embodiment of the present invention. In the example shown in FIGS. 12A and 12B, the menu "Device setup" and the menu "Basic setup" are followed from the menu "Top" in response to a user's operation of the device maintenance apparatus 1 as in the example shown in FIG. 11 (refer to the menu route display field R1). Although not shown in FIGS. 12A and 12B, a plurality of buttons are displayed in the information display field R2 of the window W in a vertically arranged state at regular intervals before the detailed search is performed as in FIG. 11.

If a user of the device maintenance apparatus 1 operates the detailed search button SB2 provided in the window W, a search box BX2 (an inputter) is displayed in the window W. If a user of the device maintenance apparatus 1 inputs a search key (search information) to the search box BX2, the searcher 14b of the device maintenance apparatus 1 performs a search using, as a search target, "Name of definition item" and "Details of definition item" defined in each definition item of the device definition information D1. If the search (the detailed search) using the searcher 14b is completed, as shown in FIG. 12A, the display processor 14a displays a list of the search results in the information display field R2 of the window W on the basis of the search results.

As exemplified in FIGS. 12A and 12B, it is assumed that "Tag" is input as a search key in the search box BX2 of the window W. Thus, information including the search key "Tag" in at least one of the detailed information and the name of the definition item of the device definition information D1 is listed and displayed as the search results in the information display field R2 of the window W. In the search result displayed in the information display field R2, a portion which matches the search key "Tag" is highlighted. When such a display is provided, it becomes possible to easily recognize the portion including the search key in a short time.

If a user of the device maintenance apparatus 1 performs an operation of specifically identifying one line of the search results displayed in the information display field R2, the display of the window W is as shown in FIG. 12B. For example, it is assumed that the bottom line (a line whose name is "Power Supply Conditions Out of Range") displayed in the information display field R2 of the window W shown in FIG. 12A is specifically identified. Thus, the display details of the information display field R2 of the window W includes the fact that a button corresponding to the specifically identified line, that is, a button B60 having the name "Power Supply Conditions Out of Range" attached thereto is displayed using the display processor 14a. An icon F which intuitively indicates that the search key is the found definition item is attached to the upper right corner of the button B60 displayed in the information display field R2 of the window W.

In this way, when the button B60 associated with the search result specifically identified by a user is displayed in the information display field R2 of the window W, the user can immediately grasp the target button B60. Furthermore, when the button B60 for a parameter whose name or detailed information includes a search key is displayed in a manner different from that of other parameter buttons, it is possible to easily recognize the button B60 which matches the search in a short time.

As described above, in the embodiment, the first button which is the button which acquires the device information from the field device FD and causes the transition to the screen on which the details of the parameter are displayed to be performed for each parameter of the field device FD using the device definition information in which the parameter of the device is defined and the acquired device information and having at least the name of the parameter and the value of the parameter attached thereto is displayed on the display 12. In this way, in the embodiment, since the plurality of pieces of information (the name of the parameter, the value of the parameter, and the transition destination of the screen on which the details of the parameter are displayed) are aggregated in one button, it is possible to easily confirm the parameter of the device and improve the work efficiency of maintenance work.

Also, in the embodiment, the second button which is a button which causes the display details of the display 12 to transition to the display details of a different layer and having the name of the menu is displayed on the display 12 together with the first button. When such a second button is provided together with the first button, the display details of the display 12 can be changed to the display details of different layers even if there is no menu display field in which the menu tree is displayed which has been required in the past.

While the device maintenance device, the device maintenance method, and the device maintenance program according to the embodiment of the present invention have been described above, the present invention is not limited to the above embodiment and can be freely modified within the scope of the present invention. For example, the menu button B1 and the method button B3 in the above embodiment have the names and the icons and the parameter button B2 has the name, the numerical value, and the unit. However, a simple graph such as a bar graph may be attached to these buttons. Furthermore, when the button having such a simple graph is operated, the detailed graph screen may be displayed. Thus, it is possible to improve the convenience of a user of the device maintenance apparatus 1.

(Supplementary Note)

An device maintenance apparatus according to an aspect of the present invention is a device maintenance apparatus (1) which maintains a device including: a storage (13) which stores device definition information (D1) in which parameters of the devices are defined; an acquirer (15) which acquires device information from a maintenance target device (FD) which is a maintenance target device; and a display processor (14a) which causes a first button (B2) which is a button which causes a transition to a screen on which the details of the parameters are displayed to be performed for each parameter of the maintenance target device using the device definition information stored in the storage and the device information acquired by the acquirer and having at least a name (N2) of a parameter and a value (V2) of the parameter attached thereto to be displayed on a display (12).

Also, in a device maintenance apparatus according to an aspect of the present invention, menus associated with the maintenance of a device and parameters of the device are hierarchically defined in the device definition information and the display processor causes a second button (B1) which is a button which causes the display details of the display to transition to the display details of a different layer and having a name (N1) of a menu attached thereto to be displayed in the display.

Furthermore, in a device maintenance apparatus according to an aspect of the present invention, procedural type processing performed on the device is further defined in the device definition information and a third button (B3) which is a button which causes the display processor to perform the procedural type processing and having a name (N3) of procedural type processing attached thereto is displayed on the display.

In addition, in a device maintenance apparatus according to an aspect of the present invention, the menus, the parameters, and the procedural type processing in each layer defined in the device definition information are linked to a menu in a next-higher-order layer and the display processor causes at least one of the first button having a name and a value of a parameter attached thereto linked to the menu having a name on the second button, the second button having a name of a menu attached thereto linked to the menu, and the third button having the name of procedural type processing attached thereto linked to the menu to be displayed in the display when the second button is operated.

Also, a device maintenance apparatus according to an aspect of the present invention includes: an inputter (BX1 or BX2) by use of which search information is input; and a searcher (14b) which searches for search information using, as a search target, the names of the parameters, the menus, and the procedural type processing defined in the device definition information, in which the display processor causes the display to display a button having a name attached thereto found using the searcher among the first button, the second button, and the third button displayed on the display in a different manner.

Furthermore, in a device maintenance apparatus according to an aspect of the present invention, detailed information regarding the parameters, the menus, and the procedural type processing is stored in the device definition information, the searcher searches for the search information using, as a search target, the names of the parameters, the menus, the procedural type processing, and detailed information defined in the device definition information, and the display processor causes a button having a name attached thereto found using the searcher or a button associated with the detailed information including the search information among the first button, the second button, and the third button displayed on the display to be displayed in a different manner.

Furthermore, in a device maintenance apparatus according to an aspect of the present invention, the display processor is configured to add, to the first button, an icon indicating that the parameter is being read while the device information is being acquired by the acquirer.

Furthermore, in a device maintenance apparatus according to an aspect of the present invention, when the parameter is edited in response to a user's operation of the device maintenance apparatus, the display processor is configured to add, to the first button, a message prompting to set the edited parameter to the device.

A device maintenance method according to an aspect of the present invention is a device maintenance method performed by a device maintenance apparatus which performs a maintenance of a device, the device maintenance method including: acquiring device information from a maintenance target device which is a device of maintenance target; and displaying, on a display, a first button using device definition information in which a parameter of the device is defined and the acquired device information, the first button being a button for transitioning to a screen on which details of the parameter is displayed for each parameter of the maintenance target device, at least a name of the parameter and a value of the parameter being attached to the first button.

Also, in a device maintenance method according to an aspect of the present invention, a menu associated with the maintenance of the device and the parameter of the device are hierarchically defined in the device definition information, and the device maintenance method further includes: displaying, on the display, a second button for transitioning display details of the display to display details of a different layer, and a name of the menu is attached to the second button.

Furthermore, in a device maintenance method according to an aspect of the present invention, procedural type processing performed on the device is further defined in the device definition information, and the device maintenance method further includes: displaying, on the display, a third button for performing the procedural type processing, and a name of the procedural type processing is attached to the third button.

In addition, in a device maintenance method according to an aspect of the present invention, the menu, the parameter, and the procedural type processing in each layer defined in the device definition information are linked to the menu in a next-higher-order layer, and the device maintenance method further includes: when the second button is operated, displaying, on the display, at least one of the first button to which the name and the value of the parameter linked to the menu whose name is attached to the second button are attached, the second button to which the name of the menu linked to the menu is attached, and the third button to which the name of the procedural type processing linked to the menu is attached.

Also, a device maintenance method according to an aspect of the present invention further includes: inputting search information; searching for the search information using, as a search target, the names of the parameter, the menu, and the procedural type processing defined in the device definition information; and displaying in a different manner, on the display, a button to which the searched name is added among the first button, the second button, and the third button displayed on the display.

Furthermore, in a device maintenance method according to an aspect of the present invention, detailed information regarding the parameter, the menu, and the procedural type processing is stored in the device definition information, and the device maintenance method further includes: searching for the search information using, as a search target, the names and the detailed information of the parameter, the menu, and the procedural type processing defined in the device definition information; and displaying, in a different manner, a button to which the searched name is added or a button associated with the detailed information including the search information among the first button, the second button, and the third button displayed on the display.

Furthermore, a device maintenance method according to an aspect of the present invention further includes: adding, to the first button, an icon indicating that the parameter is being read while the device information is being acquired.

Furthermore, a device maintenance method according to an aspect of the present invention further includes: when the parameter is edited in response to a user's operation of the device maintenance apparatus, adding, to the first button, a message prompting to set the edited parameter to the device.

A non-transitory computer readable storage medium according to an aspect of the present invention is a non-transitory computer readable storage medium storing a program executed by a computer, the program instructing the computer to: acquire device information from a maintenance target device which is a device of maintenance target; and display, on a display, a first button using device definition information in which a parameter of the device is defined and the acquired device information, the first button being a button for transitioning to a screen on which details of the parameter is displayed for each parameter of the maintenance target device, at least a name of the parameter and a value of the parameter being attached to the first button.

Also, in a non-transitory computer readable storage medium according to an aspect of the present invention, a menu associated with the maintenance of the device and the parameter of the device are hierarchically defined in the device definition information, and the program further instructs the computer to: display, on the display, a second button for transitioning display details of the display to display details of a different layer, and a name of the menu is attached to the second button.

Furthermore, in a non-transitory computer readable storage medium according to an aspect of the present invention, procedural type processing performed on the device is further defined in the device definition information, and the program further instructs the computer to: display, on the display, a third button for performing the procedural type processing, and a name of the procedural type processing is attached to the third button.

In addition, in a non-transitory computer readable storage medium according to an aspect of the present invention, the menu, the parameter, and the procedural type processing in each layer defined in the device definition information are linked to the menu in a next-higher-order layer, and the program further instructs the computer to: when the second button is operated, display, on the display, at least one of the first button to which the name and the value of the parameter linked to the menu whose name is attached to the second button are attached, the second button to which the name of the menu linked to the menu is attached, and the third button to which the name of the procedural type processing linked to the menu is attached.

A device maintenance program according to an aspect of the present invention is a device maintenance program executed by a computer, the device maintenance program instructing the computer to: acquire device information from a maintenance target device which is a device of maintenance target; and display, on a display, a first button using device definition information in which a parameter of the device is defined and the acquired device information, the first button being a button for transitioning to a screen on which details of the parameter is displayed for each parameter of the maintenance target device, at least a name of the parameter and a value of the parameter being attached to the first button.

According to the present invention, there is an effect that parameters of a device can be easily confirmed and work efficiency of maintenance work can be improved.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device maintenance apparatus which performs a maintenance of a device, comprising:
   a storage configured to store device definition information in which a parameter of the device is defined;
   an acquirer configured to acquire device information from a maintenance target device which is a device of maintenance target; and
   a display processor configured to display, on a display, a first button using the device definition information stored in the storage and the device information acquired by the acquirer, the first button being a button for transitioning to a screen on which details of the parameter is displayed for each parameter of the maintenance target device, at least a name of the parameter and a value of the parameter being attached to the first button.

2. The device maintenance apparatus according to claim 1,
   wherein a menu associated with the maintenance of the device and the parameter of the device are hierarchically defined in the device definition information, and
   wherein the display processor is configured to display, on the display, a second button for transitioning display details of the display to display details of a different layer, and a name of the menu is attached to the second button.

3. The device maintenance apparatus according to claim 2,
   wherein procedural type processing performed on the device is further defined in the device definition information, and
   wherein the display processor is configured to display, on the display, a third button for performing the procedural type processing, and a name of the procedural type processing is attached to the third button.

4. The device maintenance apparatus according to claim 3,
   wherein the menu, the parameter, and the procedural type processing in each layer defined in the device definition information are linked to the menu in a next-higher-order layer, and
   wherein when the second button is operated, the display processor is configured to display, on the display, at least one of the first button to which the name and the value of the parameter linked to the menu whose name is attached to the second button are attached, the second button to which the name of the menu linked to the menu is attached, and the third button to which the name of the procedural type processing linked to the menu is attached.

5. The device maintenance apparatus according to claim 3, further comprising:
   an inputter configured to input search information; and
   a searcher configured to search for the search information using, as a search target, the names of the parameter, the menu, and the procedural type processing defined in the device definition information,
   wherein the display processor is configured to display in a different manner, on the display, a button to which the name searched by the searcher is added among the first button, the second button, and the third button displayed on the display.

6. The device maintenance apparatus according to claim 5,
   wherein detailed information regarding the parameter, the menu, and the procedural type processing is stored in the device definition information,
   wherein the searcher is configured to search for the search information using, as a search target, the names and the detailed information of the parameter, the menu, and the procedural type processing defined in the device definition information, and
   wherein the display processor is configured to display, in a different manner, a button to which the name searched by the searcher is added or a button associated with the detailed information including the search information among the first button, the second button, and the third button displayed on the display.

7. The device maintenance apparatus according to claim 1, wherein the display processor is configured to add, to the first button, an icon indicating that the parameter is being read while the device information is being acquired by the acquirer.

8. The device maintenance apparatus according to claim 1,
wherein when the parameter is edited in response to a user's operation of the device maintenance apparatus, the display processor is configured to add, to the first button, a message prompting to set the edited parameter to the device.

9. A device maintenance method performed by a device maintenance apparatus which performs a maintenance of a device, the device maintenance method comprising:
acquiring device information from a maintenance target device which is a device of maintenance target; and
displaying, on a display, a first button using device definition information in which a parameter of the device is defined and the acquired device information, the first button being a button for transitioning to a screen on which details of the parameter is displayed for each parameter of the maintenance target device, at least a name of the parameter and a value of the parameter being attached to the first button.

10. The device maintenance method according to claim 9,
wherein a menu associated with the maintenance of the device and the parameter of the device are hierarchically defined in the device definition information, and
wherein the device maintenance method further comprises:
displaying, on the display, a second button for transitioning display details of the display to display details of a different layer, and a name of the menu is attached to the second button.

11. The device maintenance method according to claim 10,
wherein procedural type processing performed on the device is further defined in the device definition information, and
wherein the device maintenance method further comprises:
displaying, on the display, a third button for performing the procedural type processing, and a name of the procedural type processing is attached to the third button.

12. The device maintenance method according to claim 11,
wherein the menu, the parameter, and the procedural type processing in each layer defined in the device definition information are linked to the menu in a next-higher-order layer, and
wherein the device maintenance method further comprises:
when the second button is operated, displaying, on the display, at least one of the first button to which the name and the value of the parameter linked to the menu whose name is attached to the second button are attached, the second button to which the name of the menu linked to the menu is attached, and the third button to which the name of the procedural type processing linked to the menu is attached.

13. The device maintenance method according to claim 11, further comprising:
inputting search information;
searching for the search information using, as a search target, the names of the parameter, the menu, and the procedural type processing defined in the device definition information; and
displaying in a different manner, on the display, a button to which the searched name is added among the first button, the second button, and the third button displayed on the display.

14. The device maintenance method according to claim 13,
wherein detailed information regarding the parameter, the menu, and the procedural type processing is stored in the device definition information, and
wherein the device maintenance method further comprises:
searching for the search information using, as a search target, the names and the detailed information of the parameter, the menu, and the procedural type processing defined in the device definition information; and
displaying, in a different manner, a button to which the searched name is added or a button associated with the detailed information including the search information among the first button, the second button, and the third button displayed on the display.

15. The device maintenance method according to claim 9, further comprising:
adding, to the first button, an icon indicating that the parameter is being read while the device information is being acquired.

16. The device maintenance method according to claim 9, further comprising:
when the parameter is edited in response to a user's operation of the device maintenance apparatus, adding, to the first button, a message prompting to set the edited parameter to the device.

17. A non-transitory computer readable storage medium storing a program executed by a computer, the program instructing the computer to:
acquire device information from a maintenance target device which is a device of maintenance target; and
display, on a display, a first button using device definition information in which a parameter of the device is defined and the acquired device information, the first button being a button for transitioning to a screen on which details of the parameter is displayed for each parameter of the maintenance target device, at least a name of the parameter and a value of the parameter being attached to the first button.

18. The non-transitory computer readable storage medium according to claim 17,
wherein a menu associated with the maintenance of the device and the parameter of the device are hierarchically defined in the device definition information, and
wherein the program further instructs the computer to:
display, on the display, a second button for transitioning display details of the display to display details of a different layer, and a name of the menu is attached to the second button.

19. The non-transitory computer readable storage medium according to claim 18,
wherein procedural type processing performed on the device is further defined in the device definition information, and
wherein the program further instructs the computer to:

display, on the display, a third button for performing the procedural type processing, and a name of the procedural type processing is attached to the third button.

20. The non-transitory computer readable storage medium according to claim 19,
wherein the menu, the parameter, and the procedural type processing in each layer defined in the device definition information are linked to the menu in a next-higher-order layer, and
wherein the program further instructs the computer to:
when the second button is operated, display, on the display, at least one of the first button to which the name and the value of the parameter linked to the menu whose name is attached to the second button are attached, the second button to which the name of the menu linked to the menu is attached, and the third button to which the name of the procedural type processing linked to the menu is attached.

* * * * *